Nov. 1, 1927.

H. S. JOHNS

BAGGING APPARATUS

Filed Nov. 14, 1925

INVENTOR.
Henry Stinson Johns
by Fethurston Liaing & Co
attys.

Nov. 1, 1927.  1,647,703
H. S. JOHNS
BAGGING APPARATUS
Filed Nov. 14, 1925   5 Sheets-Sheet 3

INVENTOR,
Henry Stinson Johns
by Fetherstonhaugh & Co
Attys.

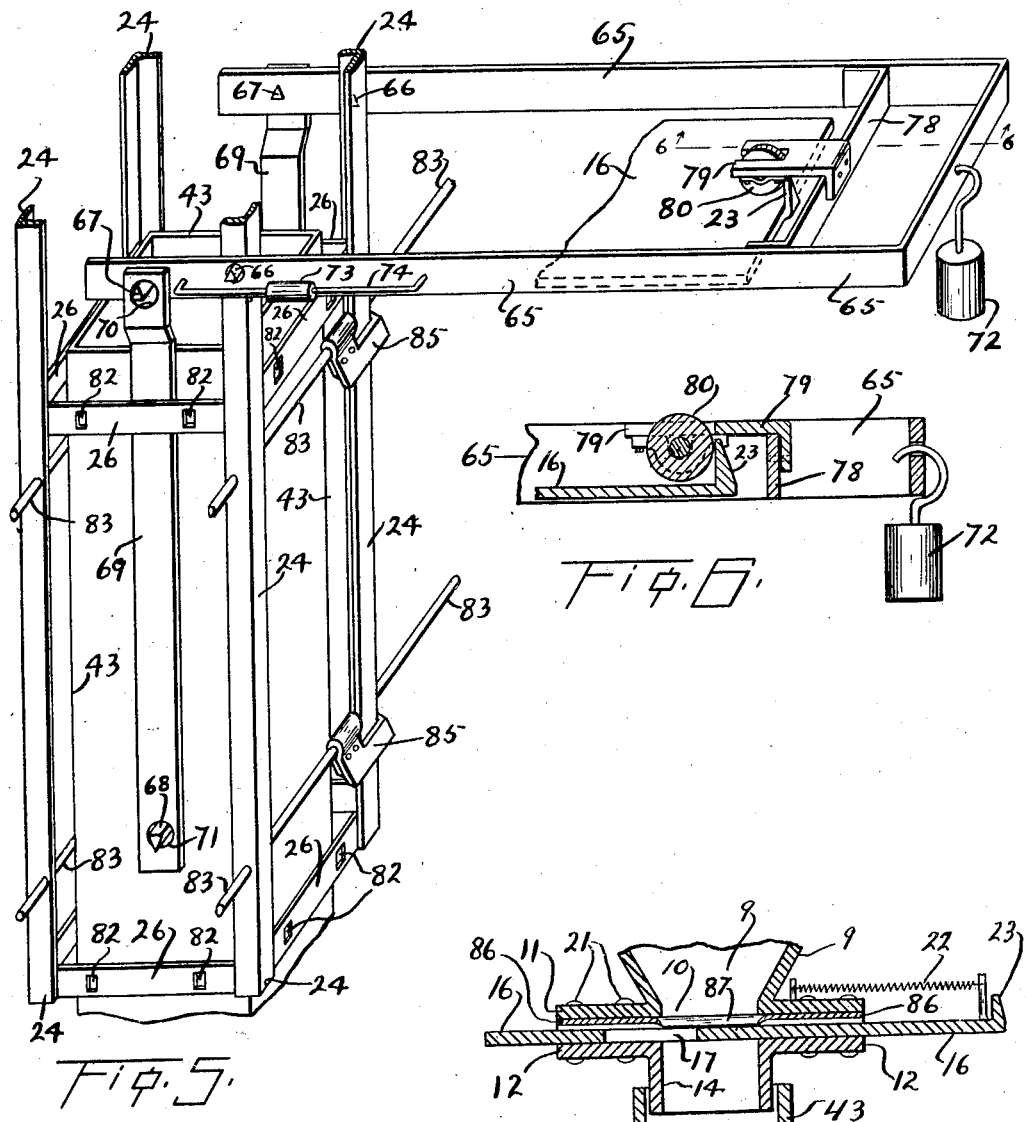

Nov. 1, 1927.

H. S. JOHNS

BAGGING APPARATUS

Filed Nov. 14, 1925

INVENTOR,
Henry Stinson Johns
by Fetherstonhaugh & Co
attys.

Patented Nov. 1, 1927.

1,647,703

UNITED STATES PATENT OFFICE.

HENRY STINSON JOHNS, OF HAMILTON, ONTARIO, CANADA, ASSIGNOR TO THE CRYSTALITE STONE PRODUCTS LIMITED, OF HAMILTON, ONTARIO, CANADA.

BAGGING APPARATUS.

Application filed November 14, 1925. Serial No. 69,127.

My invention relates to improvements in bagging apparatus and the object of the invention is to devise an improved apparatus by means of which the operation of filling bags may be facilitated and expedited; a further object is to devise an improved form of gate construction whereby the opening and closing of the delivery chutes will be rendered more efficient and in which the tendency of the material to choke or interfere with the operation of the gates will be practically eliminated; a further object is to provide a bagging apparatus which may be moved as a unit past a series of delivery chutes and which may be positioned positively and accurately with respect to any desired chute so as to receive delivery of material from said chute; and a still further object is to provide means in connection with said bagging apparatus for accurately and automatically weighing the quantity of materal deliverd to each bag and for automatically closing the gate in the delivery chute when said desired quantity of material has been delivered.

Other objects will appear in the following specification.

My invention consists essentially in a carriage, adapted to be moved relatively to a series of delivery chutes; a bagging apparatus mounted upon said carriage and comprising a hopper, means for positioning the carriage with respect to any one of the aforesaid delivery chutes so as to receive delivery of material therefrom, a weighing receptacle also mounted upon the carriage and adapted to receive delivery of the material from the aforesaid hopper, a novel form of shut-off gate in the lower portion of the hopper, means for automatically closing said gate when a predetermined weight of material has passed into the weighing receptacle, means for detachably mounting a bag at the lower end of the weighing receptacle so as to receive delivery of the material therefrom, and a novel form of shut-off gate in the lower portion of the weighing receptacle for controlling the delivery therefrom, all as hereinafter more particularly described and illustrated in the accompanying drawings in which:—

Fig. 5 is a detached perspective view, also to an enlarged scale, of a portion of my apparatus showing a weighing receptacle and the parts associated therewith.

Fig. 6 is a detached fragmentary vertical section taken on the line 6—6 of Fig. 5 looking in the direction of the arrows.

Fig. 14 is a longitudinal central vertical section through the portion of the apparatus shown in Fig. 13, but illustrating a slightly modified gate construction, the gate being shown in the partially closed position.

In the drawings, like characters of reference indicate corresponding parts in the various views.

The form of my invention illustrated is adapted particularly for use in bagging such material as crushed stone and the like.

The various grades of material are stored in elevated bins 1 (see Fig. 3) and these bins are arranged longitudinally of the shop.

Figure 3:
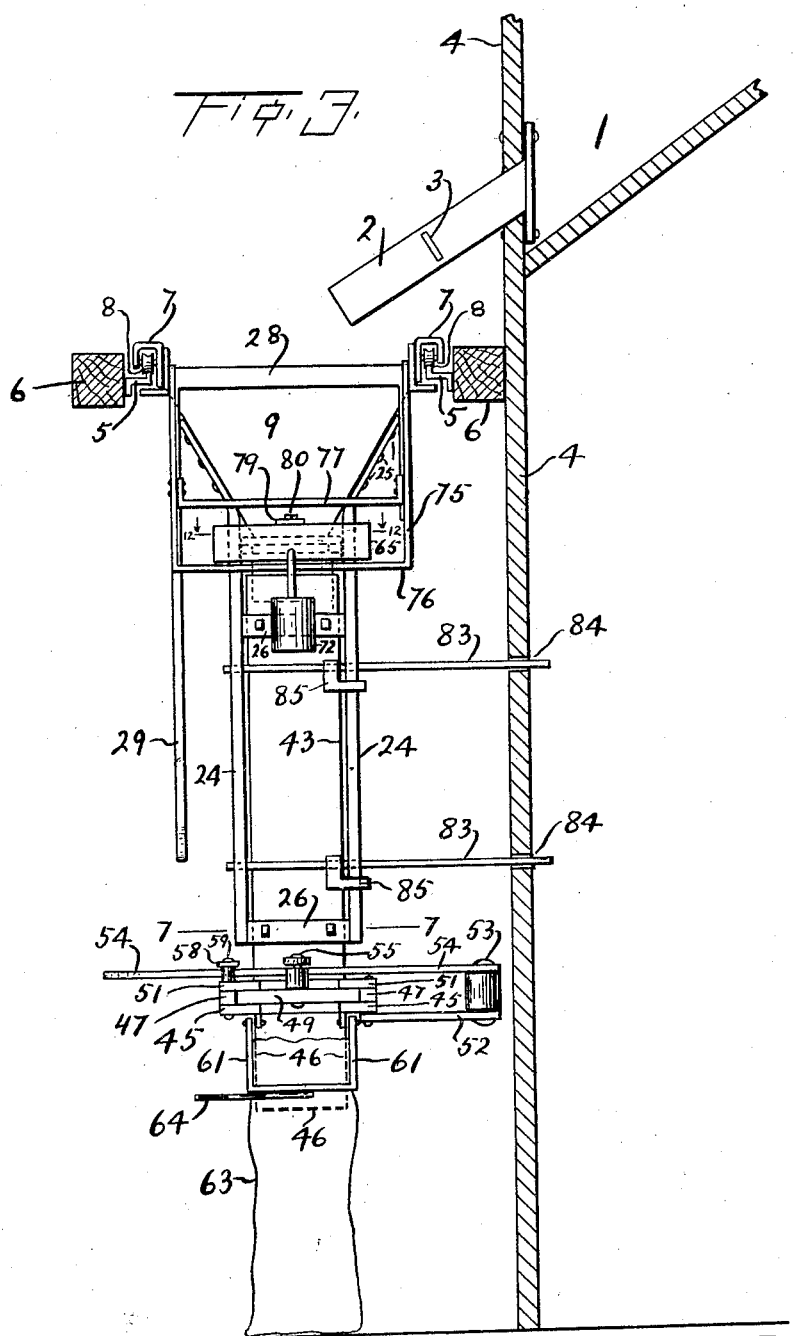
Fig. 3 is an end elevation, partly in section looking in the direction of the arrow "A" in Fig. 1.

A delivery chute 2 projects downwardly from each bin 1 and the opening and closing of these chutes is controlled by any suitable gate mechanism indicated diagrammatically at 3 (see Fig. 3).

The chutes 2 are spaced apart longitudinally of the wall 4.

Extending longitudinally of the wall 4 and below the chutes 2 is a track 5 supported upon girders 6.

Mounted to travel upon the track 5 is a carriage 7, the carriage being fitted with wheels 8 which roll upon the track 5.

Figures 8, 12:
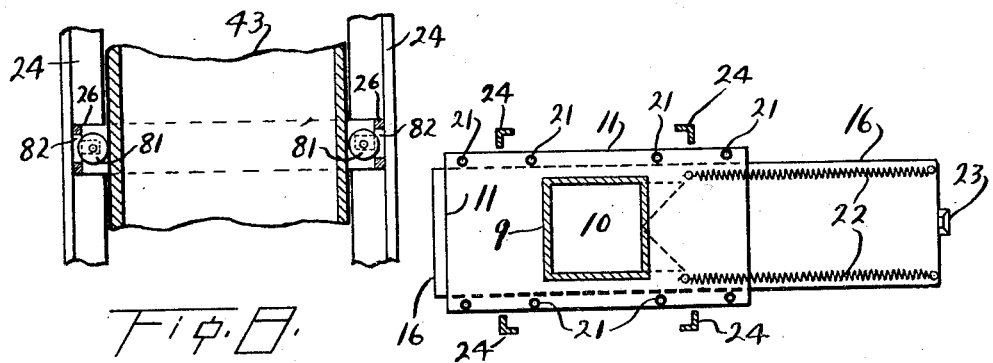
Fig. 8 is a fragmentary vertical section of a portion of the apparatus taken on the line 8—8 of Fig. 7 looking in the direction of the arrows.
Fig. 12 is a horizontal section taken on the line 12—12 of Fig. 3 showing the manner in which coil springs are used to close the gate at the bottom of the hopper, the gate being shown in the open position.

Mounted within the carriage 7 is a hopper 9 which is open at its lower end at 10 (see Fig. 12).

Figure 9:
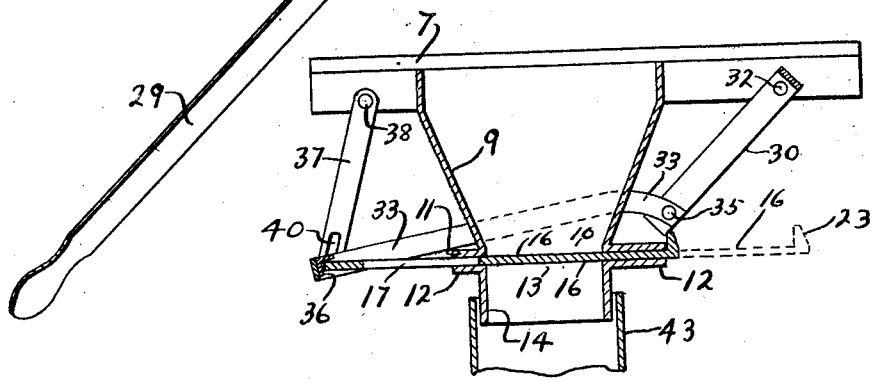
Fig. 9 is a longitudinal vertical section through the upper portion of my apparatus showing a carriage forming part thereof, a hopper mounted therein, and a gate controlling the delivery from the bottom of said hopper to a weighing receptacle.

The hopper 9 is formed with a projecting horizontal flange 11 at its lower end and below this flange is a similar plate 12 which is provided with an orifice 13 (see Fig. 9), registering with the orifice 10 on the hopper.

Extending downwardly from the orifice 13 the plate 12 is formed with a skirt portion 14.

Spacing strips 15 are interposed between the flange 11 and the plate 12 and extend longitudinally thereof at each side.

These spacing strips 15 thus separate the flange 11 and plate 12 and form a longitudinally extending space therebetween in which is slidably mounted a gate 16.

This gate is of novel construction and is made from a flat plate in which is cut a gate opening 17.

Two sides 18 and one end 19 of the opening 17 form sides of a rectangle while the end 20 is cut in V-form the apex of the V projecting inwardly into the opening 17.

The gate 16 slides between the flange 11 and plate 12, the rivets 21 securing the flange, plate and spacers together.

Figure 13:
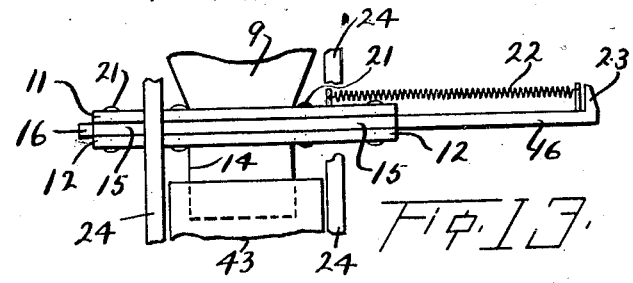
Fig. 13 is a side elevation of the portion of the apparatus illustrated in Fig. 12.

Coil springs 22 (see Figs. 12 and 13) are secured at one end to the gate 16 and at the other end to the flange 11 and act normally to urge the gate towards the left in Figs. 12 and 13 into its closed position.

At the right hand end of the gate 16 and centrally of its width is formed an upwardly disposed latch 23 which will be later referred to.

Secured to the hopper at their upper ends by rivets 25, are four depending angle-bars 24.

Connecting these angle-bars 24 at their lower ends and also at a point below the hopper 9 are horizontal bars 26 which will be later referred to.

Mounted upon the carriage 7 is a framework assembly indicated collectively by the numeral 27 (see Figs. 1 and 4), for sliding the gate 16 into its open position.

Figure 1:
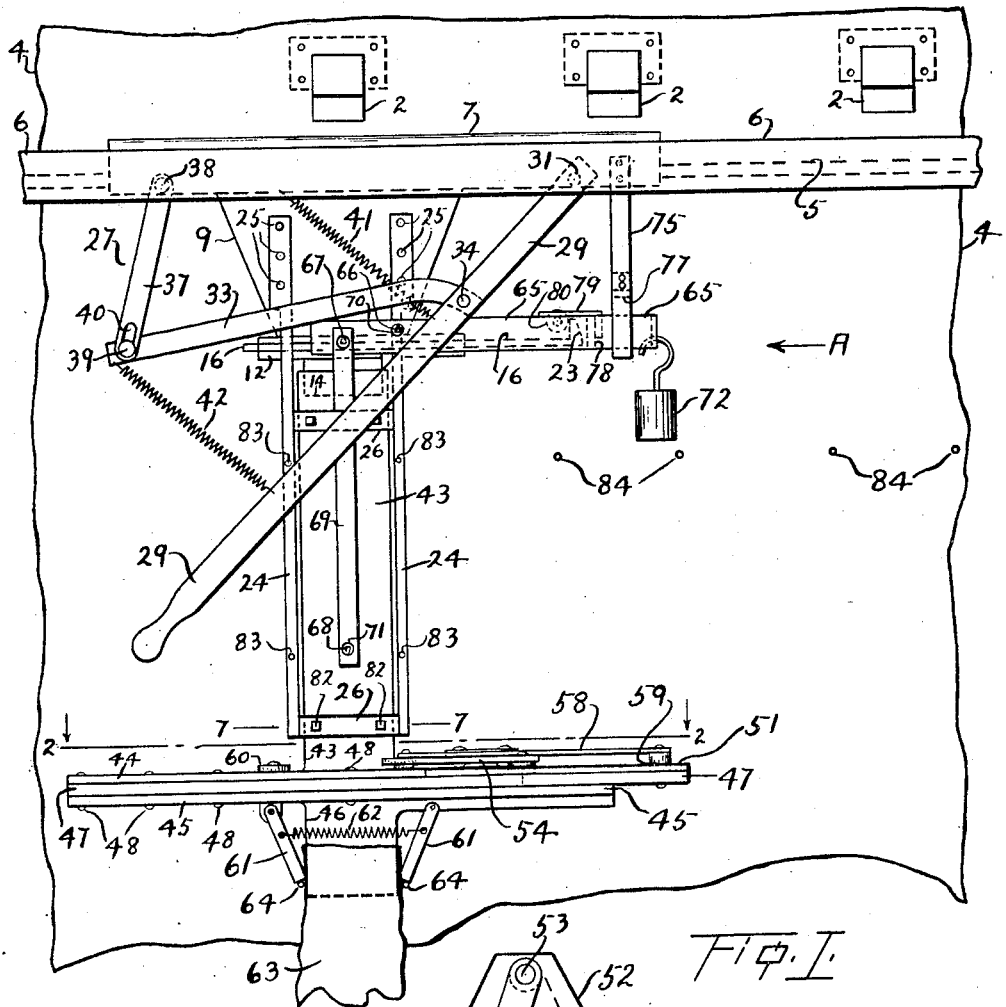
Fig. 1 is a front elevation of my improved bagging apparatus.
Figure 4:
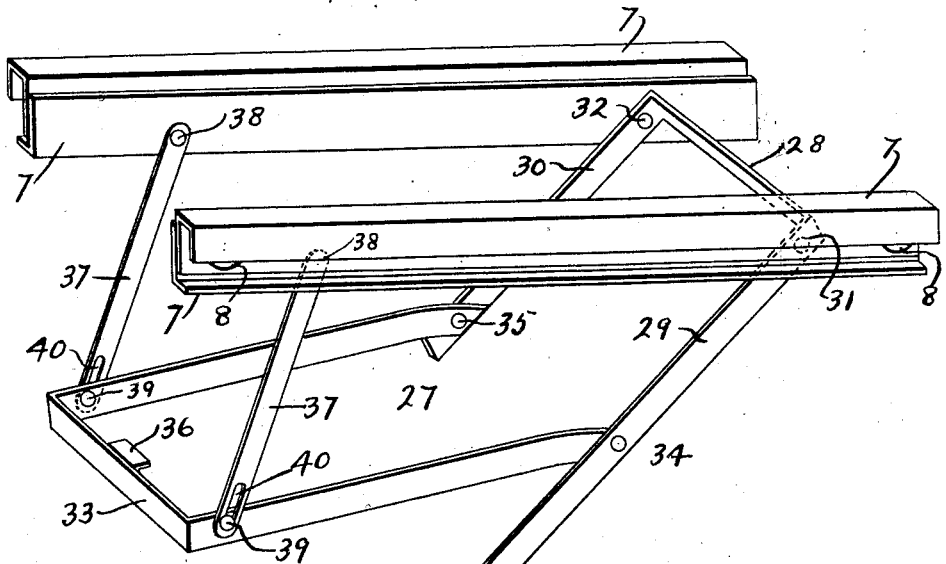
Fig. 4 is a detached perspective view, to an enlarged scale, of a carriage used in my invention, showing certain parts mounted thereon for opening a delivery gate (not shown).

The construction of this framework is clearly shown in Figs. 1 and 4 and comprises the member 28 extending transversely of the carriage and formed with the arms 29 and 31 which are pivoted to the carriage 7 at 31 and 32 respectively.

The front arm 29 is longer than the arm 30 and extends downwardly to form a hand lever for operating the frame as will presently be explained.

A yoke member 33 is pivotally connected to the arms 29 and 30 at 34 and 35 and carries a catch 36 adapted to engage the end of the gate 16.

Depending radius arms 37 are pivotally connected to the carriage 7 at 38 and to the yoke 33 by means of rivets 39 which extend through elongated slots 40 in the arms 37.

Coil springs 41 (see Fig. 1) connect the arms 29 and 30 to the carriage 7 and a further coil spring 42 connects the lower portion of the lever 29 to the yoke 33.

Situated within the space enclosed by the depending angle bars 24 is a vertically disposed weighing receptacle 43 into the upper open end of which projects the skirt portion 14.

This receptacle 43 extends somewhat below the bottom of the angle bars 24 and at its lower end carries a projecting flange 44 which constitutes what may be termed a platform.

Below this platform 44 is a plate 45 which is formed with an orifice registering with the open bottom end of the receptacle 43 and extending downwardly from this orifice is a rectangular skirt portion 46 and interposed between the platform 44 and plate 45 at either side is a longitudinal spacer 47, the platform 44, spacers 47 and plate 45 being secured together by rivets 48

The spacers 47 thus separate the platform 44 and plate 45 and form between them a space in which is slidably mounted a gate 49 provided with a gate opening 50 therein.

The construction of this gate 49 is exactly similar to that of the upper gate 16 already described except that the latch 23 is not used as other means for operating this gate are employed.

The bottom plate 45 and the spacers 47 project to the right (see Figs. 1 and 2) in the form of arms at either side and narrow cover strips 51 form guides for the upper face of the gate over this portion of the apparatus.

A supporting plate 52 projects rearwardly (see Fig. 2) upon which is pivotally mounted at 53 a lever for operating the gate 49.

Pivotally connected to the gate 49 at 55 and to the lever 54 at 56 is a link 57.

The lever 54 projects forwardly of the apparatus and a strip 58 forms a guide for the upper face of the lever, bolts 59 securing this strip at each end thereof and forming stops for limiting the movement of the lever 54 in either direction.

Secured above the platform 44 by the rivets 48 is a fixed bar 60 which projects forwardly of the apparatus, the end of this bar forming a hand grip as will be referred to later.

Pivotally connected to the under face of the plate 45 at either side of the skirt portion 46 is a yoke 61 (see Figs. 1 and 3), these yokes being connected by coil springs 62 which draw the yokes together so that their lower portions are held tightly against the skirt portion 46 so as to grip and hold a bag 63 in position upon the lower end of the skirt portion.

These yokes 61 each carry a hand grip 64 (see Fig. 3) to enable them to be swung outwardly to permit slipping the upper end of the bag in position upon the skirt portion 46.

A balance yoke 65 (see Figs. 1 and 5) is supported upon knife edges 66 mounted within the two right hand angle bars 24.

Two knife edges 67 are mounted within the arms of the yoke 65 adjacent to their left hand ends and two knife edges 68 are mounted respectively at the front and rear of the receptacle 43.

A vertical suspension arm 69 provided with suitable orifices 70 and 71 adjacent to each end thereof, operatively connects corresponding knife edges 67 and 68 and constitutes suspension means for the receptacle 43.

The usual scale counterweight 72 is carried at the right hand end of the balance yoke 65 and the usual adjusting weight 73 is mounted upon a slide 74 carried by the yoke 65.

It will thus be seen that the receptacle 43 is suspended from the balance yoke 65.

A depending bracket 75 (see Figs. 1 and 3) is carried by the carriage 7 and the lower cross arm 76 thereof forms a rest for the right hand end of the balance yoke 65.

This bracket 75 carries an upper cross bar 77 in spaced relation above the bottom bar 76 which forms a stop for limiting the upward movement of the right hand end of the balance yoke 65.

The balance yoke 65 carries a cross bar 78 (see Fig. 5) in spaced relation from its right hand end.

A bracket 79 is secured centrally to the cross bar 78 and projects towards the left (see Figs. 1, 5 and 6) and mounted upon this plate is a roller 80 which is positioned to engage the latch 23 of the gate 16 when the gate is in its open position as shown in Figs. 1, 5 and 6. This roller 80 and the latch 23 constitutes means for latching the gate in its open position as will presently be explained.

Figures 7, 10, 11:
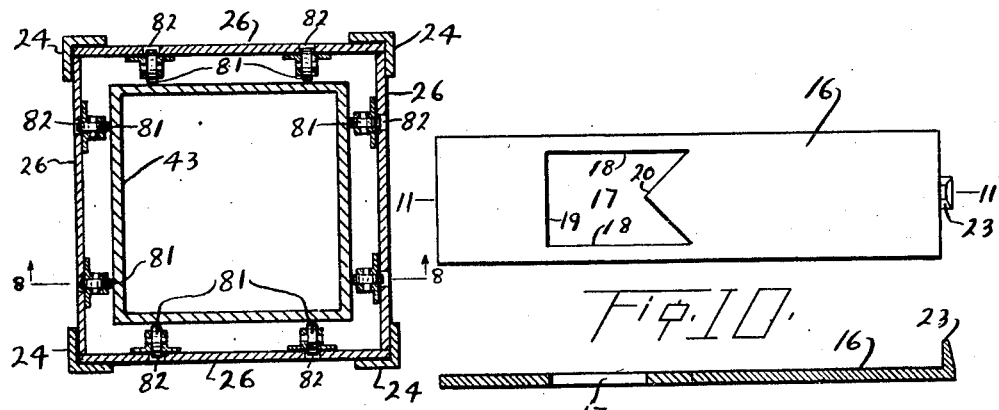
Fig. 7 is a horizontal section taken on the lines 7—7 of Figs. 1 and 3.
Fig. 10 is a detached plan view of a novel form of gate and in my invention.
Fig. 11 is a longitudinal section taken on the line 11—11 of Fig. 10.

It will be apparent that the receptacle 43 has a certain freedom of up and down movement within the frame work formed by the depending angle bars 24 and, in order to accurately guide the receptacle in this movement and to maintain it in proper alignment, rollers 81 (see Figs. 7 and 8) are mounted upon the inner faces of the horizontal cross bars 26, which rollers engage the sides of the receptacle. The cross bars 26 are provided with orifices 82 to give clearance for these rollers.

In order to provide for the convenient and accurate positioning of the carriage with respect to any one of the upper chutes 2 so that the hopper 9 will be accurately located to receive the delivery from said chute, horizontal locating bars 83 are slidably mounted in the angle bars 24, which bars are adapted to engage within suitably positioned orifices 84 (see Figs. 1 and 3) in the wall 4 and when so engaged the carriage 7 will be held in proper position with respect to the particular chute 2.

Fixed upon each bar 83 between the front and rear angle bars 24 is a latch 85 adapted to grip the rear angle bar when the locating bars 83 are in their rearmost position and engaged within the orifices 84 (see Figs. 3 and 5).

The construction and operation of my improved bagging apparatus is as follows:—

The entire apparatus it will be evident from the foregoing description taken in conjunction with the accompanying drawings is supported from the carriage 7 and travels as a unit therewith longitudinally below the chutes 2 leading from the various bins 1.

When material from my particular bin is to be bagged, the apparatus with all gates closed is slid along to the desired chute 2 and accurately positioned therebelow by engaging the locating bars 83 within the corresponding orifices 84 in the wall 4.

This positions the apparatus so that the hopper 9 is accurately below the particular chute 2 to receive the discharge therefrom.

The hopper 9 is now filled by opening the gate in the chute 2.

The construction and operation of the gates in these chutes 2 is not illustrated or described as they may be similar to the gates already described or of any other desired construction and further description thereof is not thought necessary.

When sufficient material has entered the hopper 9 the discharge from the chute 2 is shut off.

The upper gate 16 is now moved into its open position by drawing the lever 29 to the right.

This swings the entire framework 27 to the right and as the catch 36 is in engagement with the end of the gate 16 this movement of the frame 27 slides the gate to the right and when it reaches its fully opened position the latch 23 slides under the roller 80, which is held down by the balance yoke 65, and thus holds the gate in this open position (see Figs. 1, 5 and 6).

The slots 40 in the radius arms 37 allow clearance for the free operation of the frame 27 during the above opening movement of the gate 16.

As soon as the lever 29 is released it and the frame 27 are immediately pulled back into their original positions shown in Fig. 1 under the action of the springs 41 and 42.

The material from the hopper 9 now discharges into the weighing receptacle 43 and, when the desired predetermined weight has entered this receptacle, the receptacle sinks and throws the right hand end of the balance yoke 65 upwardly and with it the roller 80 so that the latch 23 of the gate 16 is released from engagement therewith and the gate is shot rapidly to the left into its closed position under the action of the coil springs 22 thus shutting off the discharge from the hopper 9.

A bag 63 is now placed in position over the open skirt portion 46 at the bottom of the receptacle 43 and is held thereon by the gripping action of the yokes 61.

The lower gate 49 is now moved to the right into its open position by means of the lever 54 and the weighed contents of the receptacle 43 are discharged into the bag.

Figure 2:
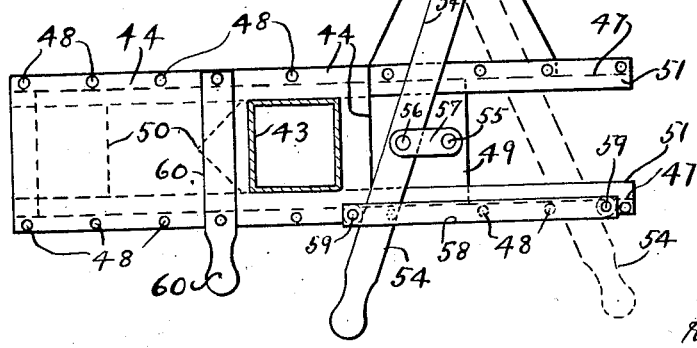
Fig. 2 is a horizontal section taken on the line 2—2 of Fig. 1 looking in the direction of the arrows.

After the receptacle has discharged all its contents into the bag the gate 49 is again closed by swinging the lever 54 to the left, back into its original position shown in full lines in Fig. 2.

The lever 54 is gripped with the right hand of the operator and, in order to render its operation more convenient, the stationary hand grip 60 is provided (see Fig. 2), to be gripped by the left hand.

The filled bag is now removed from the skirt portion 43 and replaced by an empty one, when the apparatus is ready to go through the same cycle of operation as above described to fill another bag.

Considerable difficulty is experienced in apparatus of this class due to the crushed stone or other material clogging up or interfering with the closing of gates and in order to overcome this trouble I have devised my improved form of gate in which the inwardly directed V-shaped end effectively and easily cuts its way though and throws out of its way any material which lodges in the gate guides.

If desired to further improve the operation of the gate a thin plate 86 may be used above the gate as shown in the modified construction illustrated in Fig. 14.

In this case the plate 86 is mounted between the flange 11 and the gate 16 and is formed with a rectangular opening 87, the marginal edges of which are tapered inwardly and downwardly and the plate is depressed about these edges so that the lower edge of the opening is displaced slightly below the bottom face of the plate.

This plate is held firmly against the top face of the gate so that this depressed edge very closely scrapes the top face of the gate as the gate is moved and serves to very effectively prevent clogging of the gate.

From the foregoing it will be apparent that I have devised an improved bagging apparatus of the class described whereby the objects of my invention have been obtained.

Various modifications may be made in my invention without departing from the spirit thereof or the scope of the claims and therefore the exact forms shown are to be taken as illustrative only and not in a limiting sense and I desire that only such limitations shall be placed thereon as are imposed by the prior art or are specifically set forth in the appended claims.

What I claim as my invention is:

1. In a bagging apparatus of the class described, the combination with a plurality of delivery chutes, of a movable carriage, a hopper mounted within said carriage, said carriage adapted to be moved relatively to said chutes so that the hopper may be positioned below any desired one of said chutes to receive the delivery of material therefrom, a gate controlling the discharge from said hopper, a receptacle suspended within said carriage and positioned below the hopper to receive the discharge therefrom, spring means normally urging said gate into its closed position, means for opening said gate, means for latching said gate in its open position, weighing means co-acting between said receptacle and said latching means for automatically releasing said latching means to permit closing of the gate when a predetermined weight of material has been discharged from the hopper into the receptacle, a second gate controlling the discharge from the bottom of the receptacle, means for opening and closing said second gate as desired, and means carried at the bottom of the receptacle for positioning a bag to receive the discharge therefrom.

2. In a bagging apparatus of the class described, the combination with a series of spaced apart delivery chutes, of a carriage adapted to travel longitudinally past said chutes, a hopper mounted on the carriage, means for positioning the carriage with respect to any one of said chutes so that the hopper is positioned to receive the delivery of material from said chute, a gate controlling the discharge from said hopper, a receptacle suspended from the carriage and positioned below the hopper to receive the discharge therefrom, spring means normally urging said gate into its closed position, means for opening said gate, means for latching said gate in its open position, weighing means co-acting between said receptacle and said latching means for automatically releasing said latching means to permit closing of the gate when a predetermined weight of material has been discharged from the hopper into the receptacle, a second gate controlling the discharge from the bottom of the receptacle, means for opening and closing said second gate as desired, and means carried at the bottom of the receptacle for positioning a bag to receive the discharge therefrom.

HENRY STINSON JOHNS.